(12) United States Patent
Cheng

(10) Patent No.: US 7,152,396 B2
(45) Date of Patent: Dec. 26, 2006

(54) REDUCTANT DISTRIBUTOR FOR LEAN NOX TRAP

(75) Inventor: Shi-Wai S. Cheng, Troy, MI (US)

(73) Assignee: General Motors Corporation, Detroit, MI (US)

( * ) Notice: Subject to any disclaimer, the term of this patent is extended or adjusted under 35 U.S.C. 154(b) by 49 days.

(21) Appl. No.: 11/009,527

(22) Filed: Dec. 10, 2004

(65) Prior Publication Data

US 2006/0123771 A1    Jun. 15, 2006

(51) Int. Cl.
*F01N 3/00* (2006.01)

(52) U.S. Cl. .............. 60/286; 60/274; 60/295; 60/297; 60/303; 60/324; 239/399; 239/432; 222/145.5; 222/145.6

(58) Field of Classification Search .......... 60/274, 60/286, 295, 297, 301, 303, 324; 239/398, 239/399, 416, 632; 222/137, 145.6, 145.7, 222/145.5
See application file for complete search history.

(56) References Cited

U.S. PATENT DOCUMENTS

| | | | |
|---|---|---|---|
| 5,542,249 A * | 8/1996 | Heath | 60/293 |
| 6,444,177 B1 * | 9/2002 | Muller et al. | 422/177 |
| 6,449,947 B1 * | 9/2002 | Liu et al. | 60/286 |
| 6,601,385 B1 * | 8/2003 | Verdegan et al. | 60/286 |
| 6,722,123 B1 * | 4/2004 | Liu et al. | 60/286 |
| 6,745,562 B1 * | 6/2004 | Berriman et al. | 60/324 |
| 6,775,973 B1 * | 8/2004 | Liu et al. | 60/301 |

* cited by examiner

*Primary Examiner*—Binh Q. Tran
(74) *Attorney, Agent, or Firm*—Kathryn A Marra

(57) ABSTRACT

A lean NOx trap operating in a lean NOx exhaust stream is progressively regenerated, sector to sector, for efficient operation of the trap and conservation of reducing gas used in the regeneration. A reductant gas distributor is inserted in the exhaust upstream of the trap. Reductant gas is carried into the exhaust duct through a conduit portion and the reductant gas stream diverged and directed through a distributor into selected cells of the trap. The NOx in the selected cells is reduced to $N_2$ while lean NOx exhaust continues to flow through the remainder of the trap. By relative movement of the reductant gas distributor and the trap, the entire trap is progressively and continually regenerated while still preforming as a NOx trap.

16 Claims, 2 Drawing Sheets

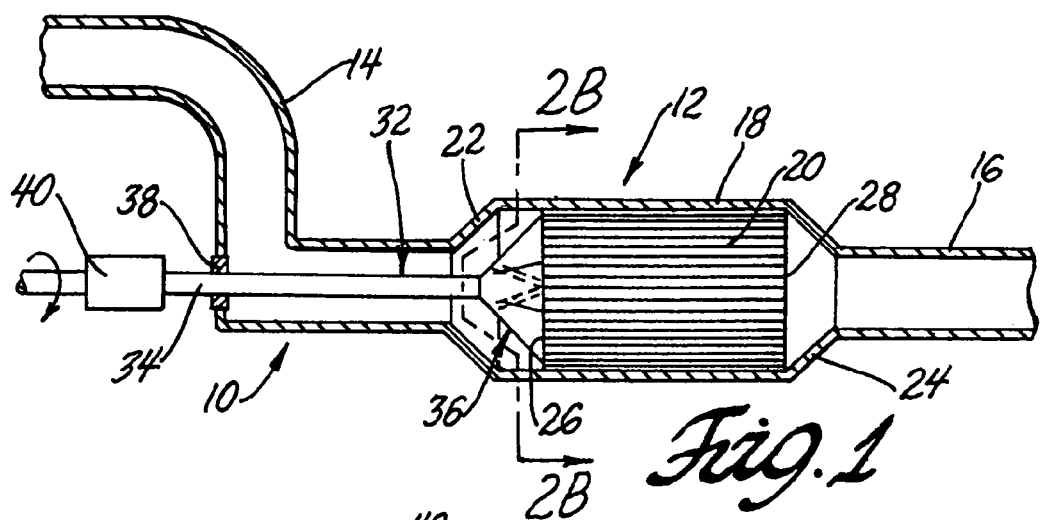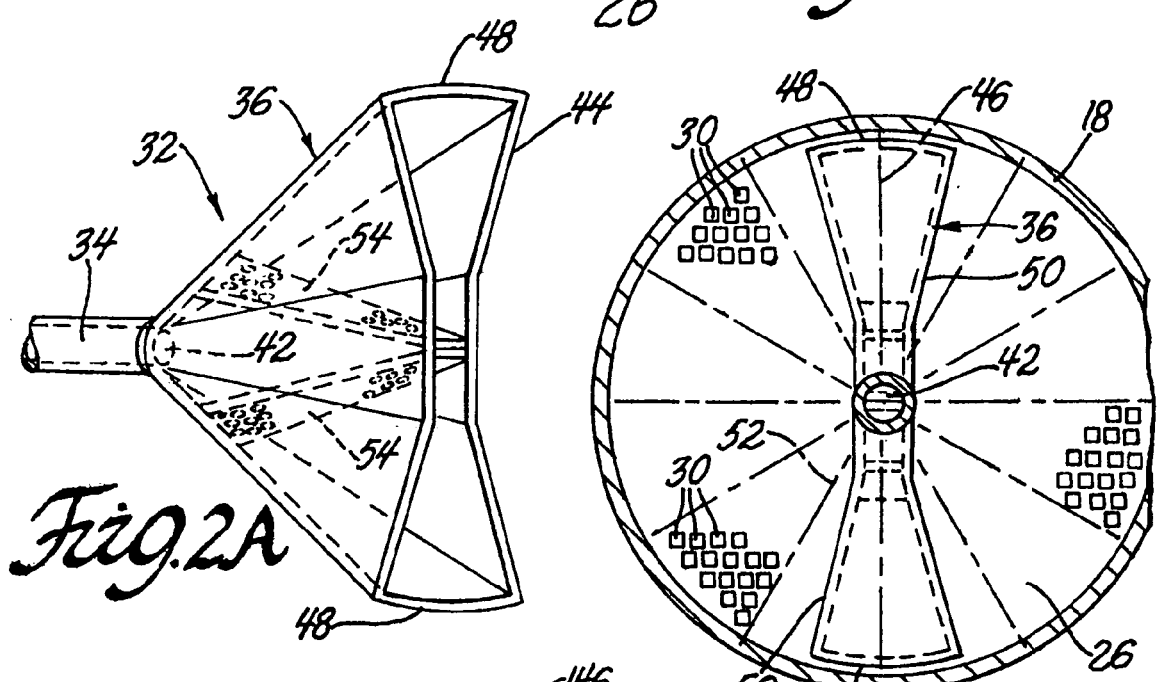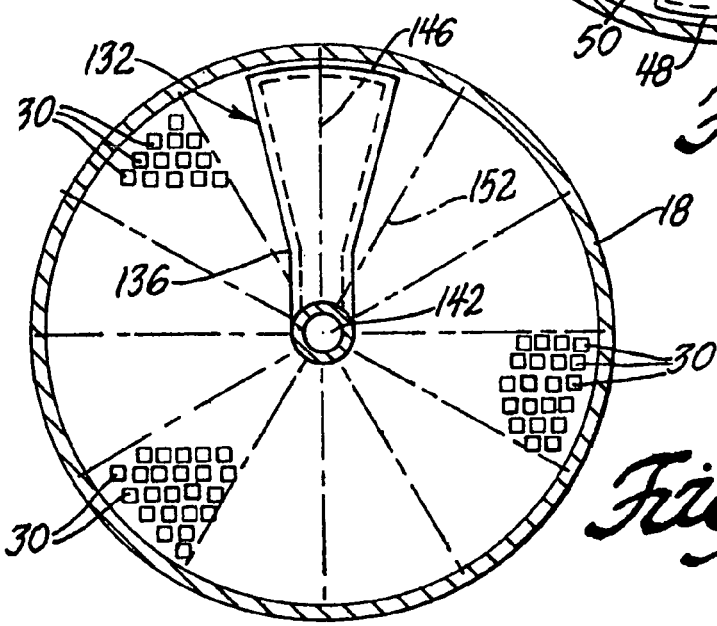

REDUCTANT DISTRIBUTOR FOR LEAN NOX TRAP

TECHNICAL FIELD

This invention pertains to the temporary trapping and subsequent reduction of nitrogen oxides (NOx) in the exhaust gas from a diesel engine or other lean-burn internal combustion engine. More specifically, this invention pertains to the progressive and continuous introduction of a reductant gas into the inlet of exhaust flow-through lean NOx traps (LNT) for catalytic reduction of the NOx to nitrogen.

BACKGROUND OF THE INVENTION

The mass ratio of air-to fuel (A/F) admitted to a diesel engine or a lean-burn gasoline engine is typically in the range of about 20–50 for good fuel economy. As a result the exhaust has a relatively low content of unburned hydrocarbons and carbon monoxide (typically about 200–700 parts per million, ppm, of hydrocarbons, and 500–1500 ppm of carbon monoxide) and a relatively low content of nitrogen oxides such as NO and $NO_2$. These nitrogen oxides are referred to collectively as NOx and a typical NOx content in a diesel exhaust is about 50–500 ppm. Due to the oxygen content of the fuel-lean exhaust, unburned HC and CO can be oxidized in a catalytic oxidation converter. But reduction of NOx to nitrogen in the oxygen-containing exhaust has been a challenge.

Flow-through traps have been used to momentarily absorb NOx from the fuel-lean exhaust. A reductant, such as a small quantity of diesel fuel is then briefly introduced into the inlet of the lean NOx trap to provide reactive species for the catalytic reduction of the absorbed NOx. The NOx trap may be an extruded cordierite honeycomb structure with hundreds of cells per square inch of cross-section extending from the inlet face to the outlet face of the extrusion. The walls of the cells may be coated with a washcoat of high surface area alumina particles which are impregnated with an absorbent for NOx such as barium carbonate ($BaCO_3$), an oxidation catalyst such as platinum, and a reduction catalyst such as rhodium and platinum. The finely divided platinum in the washcoat promotes oxidation of NO, to $NO_2$. $NO_2$ is absorbed from the lean exhaust by reaction with $BaCO_3$ to form $Ba(NO_3)_2$ (barium nitrate) with the release of $CO_2$ into the exhaust. When reductant species, such as CO, HC and/or $H_2$, are introduced into the exhaust flowing through the cellular trap, NOx is released from the $Ba(NO_3)_2$ (with regeneration of $BaCO_3$) and reduced to $N_2$ over the rhodium and platinum particles in the washcoat.

Reductant species have been added to the exhaust by briefly injecting more fuel into the cylinders of the engine to a much lower A/F of 12–14. For example, the engine is operated in its normal fuel-lean mode for sixty seconds while NOx is stored in the LNT, and then operated in a fuel rich-mode for three seconds to provide reductant species for NOx removal and reduction. This practice requires more complicated control of engine fuel injection and causes noticeable variation in engine torque. Further, it permits NOx and HC emissions while the trap is being regenerated.

Reduction species have also been added directly to the exhaust stream, upstream of the inlet of the LNT, during a trap regeneration period. While this practice minimizes or avoids changes in engine operation, it still interrupts the trapping function of the LNT and permits NOx emissions during each trap regeneration period. Thus, there is a need for an improved practice for regeneration of the LNT.

SUMMARY OF THE INVENTION

This invention provides a mechanical flow distributor for directing flow of a reductant into only a portion of the inlet face of the LNT. The inlet face of an LNT is normally flat and transverse to gas flow in the exhaust duct or pipe of the engine. The outlet of the distributor lies close to the inlet face to selectively introduce a flow of reductant gas species into only the adjacent LNT cell openings. Thus, normal exhaust flow proceeds through most for the longitudinal cell passages, but the trapped NOx in the passages affected by the distributed reductant flow is removed and reduced to nitrogen while NOx is trapped in the passages not affected by the distributor.

The distributor comprises a tubular reductant flow portion terminating in a shaped outlet spanning a predetermined section of the exhaust inlet face of the LNT. The distributor directs reductant gas into the selected cells of the trap for a brief time, sufficient to regenerate the selected cells, while deflecting the lean NOx exhaust into the larger number of remaining trap cells. The shaped outlet of the reductant distributor is then progressively moved over the entire exhaust inlet face of the LNT to continually regenerate other portions of the trap. In a different embodiment, the LNT may be rotated with respect to the shaped outlet of the reductant distributor.

In a preferred embodiment, the ceramic LNT is round in its cross-section to exhaust flow. In this embodiment, the outlet of the distributor is preferably shaped to cover a radial or diametrical section of the inlet, and the distributor outlet is rotated co-axially with the LNT to progressively and continually regenerate the trap. For example, at any time the distributor outlet may cover a $\frac{1}{6}^{th}$ or $\frac{1}{12}^{th}$ segment of the LNT inlet for regeneration of that portion while the remainder of the inlets are receiving exhaust gas and trapping NOx.

Thus, the engine exhaust stream is shaped to permit positioning of the reductant distributor with its outlet adjacent the inlet of the LNT. The delivery tube of the reductant distributor extends outside the exhaust pipe or duct for receiving reductant gas from a suitable reductant generator or storage vessel. A suitable electromechanical actuator is provided to move, preferably rotate, the distributor outlet progressively over the inlet face of the LNT. Conversely, the LNT may be moved or rotated with respect to the distributor outlet.

Suitable, typically small, amounts of lean NOx exhaust may be admitted to the reductant distributor to provide oxygen for thermal oxidation and heating of the reductant and exhaust gases in the cells. In this embodiment, the reductant distributor is preferably fitted with a suitable oxidation catalyst package. The HC oxidation raises the temperature of the reductant-containing gases flowing in the cells of the regenerating part of the LNT and speeds up the NOx reduction.

Suitable reductants include diesel fuel, gasoline and other relatively low molecular weight hydrocarbon vapors or gases. As a further example, gaseous reformation or partially oxidized products of hydrocarbon fuels such as a mixture of carbon monoxide, hydrogen and hydrocarbon by-products may be delivered through the reductant distributor to the LNT inlet.

Other objects and advantages of the invention will become more apparent from a detailed description of embodiments of the invention.

BRIEF DESCRIPTION OF THE DRAWINGS

FIG. 1 is a cross-sectional view of a portion of an exhaust system of a lean burn engine, such as a diesel engine. The illustrated portion of the exhaust system includes a lean NOx trap, LNT, and a reductant distributor in accordance with this invention, both located in a section of the exhaust pipe.

FIG. 2A is an oblique view of one embodiment of a reductant distributor.

FIG. 2B is a cross-sectional view taken at direction 2B—2B of FIG. 1 and showing an instantaneous location of the reductant distributor of FIG. 2A opposite a diametric segment of the circular inlet face of the LNT of FIG. 1.

FIG. 3 is a view like FIG. 2B showing another embodiment of a reductant distributor opposite a radial segment of the circular inlet of the LNT of FIG. 1.

DESCRIPTION OF PREFERRED EMBODIMENTS

Figure 4:
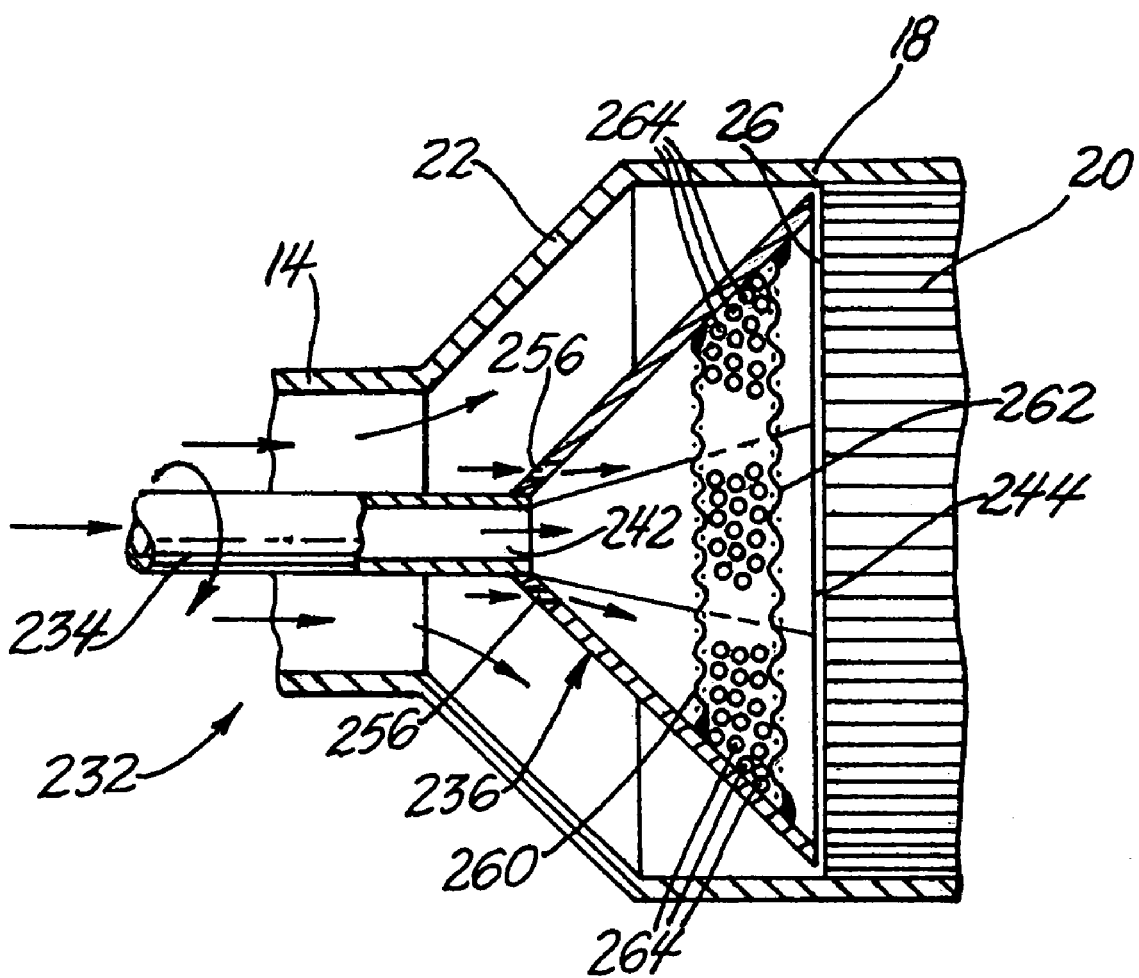
FIG. 4 is a cross-sectional view of a portion of an LNT and still another embodiment of a reductant distributor, both located in a section of the exhaust pipe. In this embodiment the reductant distributor has inlet holes for a fraction of the lean exhaust stream, and an oxidation catalyst for oxidizing a portion of the reductant stream and thereby heating the mixed stream for increasing the temperature of the portion of the LNT being regenerated.

As stated above, the exhaust from a lean burn engine contains unburned hydrocarbons, carbon monoxide, carbon dioxide, nitrogen oxides (collectively NOx), water, oxygen and nitrogen. Once the engine is warmed-up, the exhaust temperature may be in the range of 150° C. to about 500° C. depending upon engine load and other operating conditions. A portion of the engine exhaust may be re-circulated into the engine air supply. In other engine embodiments, the engine exhaust may first be directed through a turbocharger for increasing engine air intake, or the exhaust may flow directly into the exhaust conduit or pipe carried under the vehicle for exhaust discharge at the rear of the vehicle. Most, if not all, modern diesel engines have turbocharged air intake. Once the exhaust leaves the vicinity of the engine, it may flow through a catalyst-containing oxidation converter to utilize the oxygen in the exhaust to oxidize carbon monoxide to carbon dioxide and to complete the combustion of incompletely burned hydrocarbons. Generally, this oxidation catalyst is used mainly to increase the exhaust temperature for the exhaust after-treatment. This invention is applicable to any such engine and exhaust combination.

The NOx containing exhaust from a diesel engine, or other lean burn engine, may then be directed to a lean NOx trap for temporary storage of the oxides of nitrogen. This invention is applicable to the regeneration of the LNT.

FIG. 1 illustrates a portion of an exhaust conduit downstream from a diesel engine and any oxidation converter. Exhaust conduit section 10 includes a lean NOx trap-enclosing conduit section 12, an upstream exhaust conduit section 14 leading to LNT-enclosing section 12, and a downstream exhaust conduit section 16 leading from LNT-enclosing section 12. Upstream and downstream exhaust conduit sections 14, 16 are usually round in cross-section and sized to carry the exhaust without excessive back-pressure. LNT-enclosing section 12 has a larger diameter circular chamber 18 for retaining the round cylinder LNT 20 between a conical exhaust inlet chamber 22 and a conical exhaust outlet chamber 24. The respective exhaust conduit sections 14, 16, 18, 22, and 24 are typically made of a stainless steel material (like much of the exhaust piping system) and joined into a continuous flow passage 12 for the exhaust into and through LNT 20 and downstream for further treatment or discharge to the atmosphere.

LNT 20 is often an extruded cordierite honeycomb structure with hundreds of cells (depicted schematically at 30 in FIGS. 2B and 3) per square inch of cross-section extending from the inlet face 26 to the outlet face 28 of the extrusion. The side walls of cells 30 are typically coated with a washcoat of high surface area alumina particles which are impregnated with an absorbent for NOx such as barium carbonate, an oxidation catalyst such as platinum, and a reduction catalyst such as a combination of rhodium and platinum. As summarized above, the finely divided platinum in the washcoat promotes oxidation of NO, to $NO_2$. $NO_2$ is absorbed from the lean exhaust by reaction with $BaCO_3$ to form $Ba(NO_3)_2$ with the release of $CO_2$ into the exhaust. When reductant species, such as CO, HC and/or $H_2$, are introduced into the exhaust flowing through cellular trap 20 in an oxygen-deficient environment, NOx is released from the $Ba(NO_3)_2$ (with regeneration of $BaCO_3$) and reduced to $N_2$ over the rhodium and platinum particles in the washcoat.

In accordance with this invention, upstream exhaust conduit 14 is curved or otherwise suitably shaped for placement of a reductant gas distributor 32 for delivery of a reductant gas to a portion of the inlet face 26 of LNT 20 and for blocking the exhaust gas, which contains NOx and oxygen from entering the regenerating section. Inlet face 26 is planar and aligned transversely to the exhaust flow. Reductant distributor 32 has a conduit portion 34 leading to a diverging reductant gas distributor outlet 36. The tubular conduit portion 34 extends through a wall of upstream conduit section 14 and is supported in a sealing bushing 38 which permits rotation of reductant distributor 32 while retaining engine exhaust within the upstream exhaust conduit 14. A suitable drive connection or self-powered mechanism, shown schematically by block 40, rotates reductant distributor conduit 34 and attached reductant distributor outlet 36 for progressive delivery of reductant gas into successive portions of cells 30 at inlet face 26 of LNT 20. A battery powered electric motor may be employed as the reductant distributor rotation mechanism.

In an alternative embodiment, means is provided to rotate the LNT 20 within its housing 18 and the reductant distributor 32 is not rotated. The idea is to provide relative motion between the inlet face 26 of the LNT 20 and the reductant distributor outlet 36 for progressive regeneration, portion-by-portion, of the LNT.

The reduction gas distributor conduit 34 receives and conducts a stream of reductant gas from a suitable source, not shown, and delivers the reductant material to reductant gas distributor outlet 36 with sufficient pressure to direct the reductant gas flow into a selected segment of cells 30 of the LNT 20 as will be described in connection with FIG. 2B. The source of the reductant gas may be a gaseous hydrocarbon such as vaporized diesel fuel or gasoline. In another embodiment, such a hydrocarbon fuel may be delivered from on-vehicle storage to a reformer in which the hydrocarbons are converted to more reactive reduction species; for example, a mixture of hydrogen, carbon monoxide and very small HC molecules. In accordance with a preferred embodiment of the invention, a relatively low volume continuous stream of such reformed gas mixture is delivered to the LNT 20 through reductant gas distributor conduit 34 and attached reductant distributor outlet 36.

Reductant gas distributor outlet 36 is shaped and sized to direct the flow of reductant gas into the inlet face 26 openings of a selected segment of cells 30 in LNT 20. The atmosphere in the selected segment of cells is temporarily changed from an oxidizing environment to a chemically reducing environment. The function of distributor outlet 36 is to disperse or expand and channel the flow of reductant gas into a portion of the cells 30 of the LNT 20 for catalyzed removal of stored NOx and its chemical reduction to nitrogen. In the meantime, oxygen-containing exhaust gas flows around the outside of reductant distributor outlet 36 into the remainder of LNT cells 30 and NOx is absorbed from the exhaust. Thus, throughout the operation of a warmed-up engine, some cells 30 of LNT 20 are receiving reductant gas from distributor outlet 36 for removal and elimination of stored NOx, and the remainder of the cells 30 (usually the majority of the cells) are being used to trap NOx from the exhaust and temporarily store it until the reductant distributor outlet 36 is progressively moved into position for regeneration of these cells.

In the exhaust system illustrated in FIGS. 1 and 2B the LNT 20 is a round cylinder which is a common design for such a trap. Accordingly, in a preferred embodiment, reductant distributor outlet 36 is shaped and sized to deliver reductant gas to successive diametric sections of inlet face 26 of LNT 20. Distributor outlet 36 is generally triangular in side elevation view as seen in FIGS. 1 and 2A. At the apex or narrow end of reductant distributor outlet 36, is a round inlet 42 connected to the outlet end of reductant distributor conduit portion 34. The flow axes of reductant conduit 34 and reductant distributor outlet 36 are co-axial with the center of the round LNT 20. The distributor outlet 36 diverges from its inlet 42 to its outlet end or face 44. As seen in FIG. 2B, reductant distributor outlet face 44 is sized and shaped to closely overlie a diametric segment (around diameter 46) of inlet face 26 of LNT 20. Diametrically opposed edges 48 of distributor outlet face 44 lie close to the inner surface of circular chamber 18 enclosing LNT 20. Sides 50 of distributor outlet 36 are shaped and spaced to cover a diametrical segment around diameter 46. Perforated diverter strips 54 are each fixed at one end to opposite diverging sides of the outlet 36. Diverter strips merge (to form a V configuration) and are fixed together at the other end in a joint at the flow axis of the distributor outlet 36. Diverter strips 54 direct reductant gas flow in an expanding or diverging path to enter enclosed LNT cells 30 along the full diameter of the LNT inlet face segment being treated.

In its operation, reductant gas distributor 32 selectively directs a flow of reductant gas material into the LNT cell 30 openings covered by the outlet face 44. Engine exhaust gas flows around the distributor conduit 34 and distributor outlet 36 into the larger number of LNT cells left open by reductant gas distributor 32.

In FIG. 2A, distributor outlet 36 is seen covering a diametrical segment of LNT inlet face 26 spaced about inlet face diameter 46. After a period of, for example, a few seconds during which the reductant flow brings about the removal of NOx from the covered segment (and its reduction to $N_2$) of the LNT, drive 40 rotates distributor 32 so that distributor outlet 36 covers a different diametrical segment about diameter 52 (for example). After each brief regeneration period the reductant distributor 32 is moved to successively regenerate each section of the LNT 20. In this example, six such regeneration periods are required to complete one regeneration cycle of the entire LNT. While about one-sixth of the LNT is being stripped of stored NOx, the remaining five-sixths of the inlet face area is receiving exhaust and continuing to trap NOx.

It is now apparent that the distributor outlet portion 36 of the reductant gas distributor 32 is shaped to treat a predetermined, relatively small portion of the inlet face 26 of LNT 20. In general it is preferred, but not required, that the LNT be round in cross-section at its inlet so that the distributor 32 can be rotated over a circular area. However, other LNT inlet face profiles can be accommodated by appropriated sizing, shaping, and movement of the distributor outlet portion 36.

Since this invention permits more or less continual regeneration of an LNT, the size of the reductant distributor outlet 36 may be smaller to more fully utilize the cross-sectional area of the trap. FIG. 3 illustrates a second embodiment of a reductant distributor 132 with a distributor outlet 136 shaped to treat only a radial segment (around radius 146) of inlet face 26 of LNT 20. In this embodiment, reductant gas entering inlet 142 of distributor outlet regenerates only about one-twelfth of the LNT at one time.

The relative motion between the reductant gas distributor and the LNT can progress stepwise, as described, or continuously at a rate determined to fully regenerate the LNT upon one full rotation of the distributor or the LNT.

FIG. 4 illustrates another embodiment of the invention in which the reductant distributor admits a small portion of the lean exhaust steam for the purpose of oxidizing a portion of the reductant stream and heating it to accelerate regeneration of the LNT. In FIG. 4, reductant distributor 232 is formed with small exhaust gas inlet holes 256 (two shown in FIG. 4) in the reductant distributor outlet 236 near inlet 242 where it is attached to reductant distributor conduit 234. Such exhaust gas inlet holes 256 permit a small amount of oxygen-containing gas to enter the reductant distributor outlet 236. As indicated by the arrows in upstream exhaust conduit 14 and conical exhaust inlet chamber 22 most of the lean exhaust stream flows around the reductant distributor 232 and enters portions of the LNT 20 not covered by reductant distributor outlet 236. However, a small portion of the lean exhaust enters exhaust gas inlet holes 256 and mixes with the reductant stream flowing through reductant distributor conduit 234 and inlet 242 of the distributor outlet 236.

In this embodiment, reductant distributor outlet 236 contains an oxidation catalyst such as small particles of platinum or palladium dispersed on beads of high surface area alumina. Reductant distributor outlet comprises an upstream screen 260 and an axially displaced downstream screen 262. The space between screens 260 and 262 is filled with oxidation catalyst beads 264. Thus, beads 264 make a flow-through oxidation catalyst bed.

The oxygen containing exhaust mixes with reductant species from reductant distributor conduit 234 in reductant distributor outlet 236 and flows through beads 264. The amount of admitted oxygen containing lean exhaust oxidizes a portion of the reductant species in the mixture to heat the stream exiting reductant distributor outlet face 244 and entering the portion of the LNT inlet face 26 covered by reductant distributor outlet 236. The flow of reductant and admitted lean exhaust is managed for regeneration of the cells 30 of the LNT 20 then being treated. Thus, the reducing atmosphere is heated within reductant distributor outlet 236 for faster NOx removal from the affected cells of the LNT 20 and reduction to nitrogen (regeneration). The heated reductant stream then enters those longitudinal cells 30 (FIGS. 2B and 3) of LNT 20 covered by reductant distributor outlet 236. Progressive or continuous rotation of reductant distributor 232 is employed to periodically regenerate the whole LNT 20.

Thus, in this reductant distributor configuration, it is preferred that a suitably shaped oxidation catalyst package, such as a bed of beads 264, is installed inside the reductant distributor outlet 236. The oxidation catalyst will promote the exothermic reaction within the reductant distributor outlet 236 between the oxygen and reductants flowing to the LNT 20. In some embodiments of the reductant distributor it may be preferred to use the oxidation catalyst in a different form in the reductant distributor outlet. It may be preferred to deposit the oxidation catalyst material as a washcoat on a metal or ceramic monolith support. In this embodiment, the catalyst bearing monolith would be suitably positioned and fixed in the reductant distributor outlet 236 in a manner like screens 260 and 262 and beads 264 are positioned and fixed.

It is recognized that the overall exhaust system may also be designed to contain an oxidation reactor downstream of the LNT and the reductants gas distributor to complete combustion of residual reducing species.

While the invention has been described in terms of a few preferred embodiments, it is apparent that other embodiments within the scope of the invention can readily be adapted by those skilled in the art.

The invention claimed is:

1. A reductant distributor for placement in a stream of lean NOx exhaust flowing through a lean NOx trap, the NOx trap having an inlet face comprising openings of longitudinal cells for through-flow of lean NOx exhaust, the cells having cell walls carrying absorbent material for trapping NOx from lean NOx exhaust and for releasing NOx in the presence of a reducing atmosphere for trapped NOx; the reductant distributor comprising:

a reductant gas conduit, a reductant gas distributor with an outlet, and a mechanism for progressive positioning of the outlet of the reductant gas distributor at portions of the inlet face of the lean NOx trap;

the reductant gas conduit having an inlet for receiving reductant gas under gas flow pressure and transporting it to the reductant gas distributor, the reductant gas distributor having an inlet for reductant gas from the reductant gas conduit and a distributor outlet shaped to release the reductant gas at a predetermined sector portion of the inlet face of the lean NOx trap while deflecting the lean NOx exhaust stream to other portions of the inlet face, the reductant gas distributor being shaped for divergent flow of the reductant gas from the inlet to the distributor outlet to release the reductant gas in a flow path aligned with the longitudinal cells of the NOx trap, the reductant gas distributor including an internal deflector in the flow path for directing divergent reductant gas flow from the inlet to the outlet, and the positioning mechanism being operative for progressive relative movement between the distributor outlet and sector portions of the inlet face of the lean NOx trap for reduction of trapped NOx in a sector while lean NOx exhaust is flowing through cells of the trap not receiving reductant gas from the distributor.

2. A reductant distributor as recited in claim 1 in which the positioning mechanism rotates the reductant distributor.

3. A reductant distributor as recited in claim 1 comprising a reductant gas distributor shaped for divergent flow of the reductant gas from the reductant gas conduit against a radial or diametrical sector portion of a circular inlet face.

4. A reductant distributor as recited in claim 1 comprising a reductant gas distributor shaped for divergent flow of the reductant gas from the reductant gas conduit against the sector portion of the inlet face, the reductant gas distributor further comprising a lean NOx exhaust inlet for mixing lean NOx exhaust with the reductant gas.

5. A reductant distributor as recited in claim 4 comprising an oxidation catalyst for reaction of oxygen in the lean NOx exhaust with reductant gas.

6. A method of regenerating a lean NOx trap through which lean NOx exhaust is flowing, the NOx trap having an inlet face comprising openings of longitudinal cells for through-flow of lean NOx exhaust, the cells having cell walls carrying absorbent material for trapping NOx from lean NOx exhaust and for releasing NOx in the presence of a reducing atmosphere for trapped NOx, the method comprising:

selectively directing a stream of reducing gas through a reductant gas distributor which affects divergent flow of the reducing gas in a reductant gas flow path aligned with the longitudinal cells of the NOx trap and then directs the reducing gas through a portion of the inlet face cell openings while diverting the flow of lean NOx exhaust through the remainder of the inlet face cell openings, the flow of reducing gas being continued to reduce and remove trapped NOx from the cell walls exposed to the reductant gas flow in the selected portion.

7. The method of regenerating a lean NOx trap as recited in claim 6 comprising progressively re-directing the flow of reducing gas from portion to portion of inlet face cell openings until each cell of the trap has been treated with reducing gas.

8. The method of regenerating a lean NOx trap as recited in claim 6 comprising progressively re-directing the flow of reducing gas from portion to portion of inlet face cell openings until each cell of the trap has been treated with reducing gas; and continually repeating the progressive re-directing of flow of reducing gas through portions of inlet face openings for repeated timely removal of trapped NOx from the lean NOx trap during lean NOx exhaust flow.

9. The method of regenerating a lean NOx trap as recited in claim 6 when the inlet face of the NOx trap is circular and the flow of reducing gas is directed at radial or diametrical sectors of cell openings of the inlet face.

10. The method of regenerating a lean NOx trap as recited in claim 7 when the inlet face of the NOx trap is circular and the flow of reducing gas is directed at radial or diametrical sectors of cell openings of the inlet face.

11. The method of regenerating a lean NOx trap as recited in claim 8 when the inlet face of the NOx trap is circular and the flow of reducing gas is directed at radial or diametrical sectors of cell openings of the inlet face.

12. The method of regenerating a lean NOx trap as recited in claim 6 in which a minor portion of lean NOx exhaust is mixed with the reducing gas for thermal oxidation in the selected cells and heating of the cell walls for catalytic reduction of trapped NOx.

13. The method of regenerating a lean NOx trap as recited in claim 7 in which a minor portion of lean NOx exhaust is mixed with the reducing gas for thermal oxidation in the selected cells and heating of the cell walls for catalytic reduction of trapped NOx.

14. The method of regenerating a lean NOx trap as recited in claim 8 in which a minor portion of lean NOx exhaust is mixed with the reducing gas for thermal oxidation in the selected cells and heating of the cell walls for catalytic reduction of trapped NOx.

15. The method of regenerating a lean NOx trap as recited in claim 9 in which a minor portion of lean NOx exhaust is mixed with the reducing gas for thermal oxidation in the selected cells and heating of the cell walls for catalytic reduction of trapped NOx.

16. A reductant distributor for placement in a stream of lean NOx exhaust flowing through a lean NOx trap, the NOx trap having an inlet face comprising openings of longitudinal cells for through-flow of lean NOx exhaust, the cells having cell walls carrying absorbent material for trapping NOx from lean NOx exhaust and for releasing NOx in the presence of a reducing atmosphere for trapped NOx; the reductant distributor comprising:

a reductant gas conduit, a reductant gas distributor with an outlet, and a mechanism for progressive positioning of the outlet of the reductant gas distributor at portions of the inlet face of the lean NOx trap;

the reductant gas conduit having an inlet for receiving reductant gas under gas flow pressure and transporting it to the reductant gas distributor;

the reductant gas distributor having an inlet for reductant gas from the reductant gas conduit, a distributor outlet shaped to release the reductant gas at a predetermined sector portion of the inlet face of the lean NOx trap while deflecting the lean NOx exhaust stream to other portions of the inlet face, an inlet for lean exhaust gas, and an oxidation catalyst for oxidation of a portion of the reductant gas to increase the temperature of gas released at the inlet face; and the positioning mechanism being operative for progressive relative movement between the distributor outlet and sector portions of the inlet face of the lean NOx trap for reduction of trapped NOx in a sector while lean NOx exhaust is flowing through cells of the trap not receiving reductant gas from the distributor.

\* \* \* \* \*